United States Patent [19]

Seymour

[11] Patent Number: 5,476,221
[45] Date of Patent: Dec. 19, 1995

[54] EASY-TO-INSTALL THERMOSTATIC CONTROL SYSTEM BASED ON ROOM OCCUPANCY

[76] Inventor: Richard L. Seymour, 1218 Temple City Blvd. #9, Arcadia, Calif. 91007

[21] Appl. No.: 188,399

[22] Filed: Jan. 28, 1994

[51] Int. Cl.⁶ .................................................. F24F 7/00
[52] U.S. Cl. ............................................ 236/47; 236/51
[58] Field of Search .................... 236/47, 51; 165/11, 165/1

[56] References Cited

U.S. PATENT DOCUMENTS

| | | | |
|---|---|---|---|
| 3,729,735 | 4/1973 | Dageford | 236/1 R |
| 3,754,227 | 8/1973 | Andersson | 340/286 |
| 3,797,009 | 3/1974 | Crudgingtion, Jr. | 340/286 |
| 3,975,724 | 8/1976 | Schultz | 340/286 |
| 4,101,886 | 7/1978 | Grimes et al. | 165/14 |
| 4,194,181 | 3/1980 | Brundage | 340/286 |
| 4,315,596 | 2/1982 | Johnson, Jr. et al. | 236/94 |
| 4,948,045 | 8/1990 | Romano | 236/51 |
| 5,100,053 | 3/1992 | Manson et al. | 236/47 |
| 5,127,575 | 7/1992 | Beerbaum | 236/46 |
| 5,153,560 | 10/1992 | Ichikawa | 340/522 |
| 5,165,465 | 11/1992 | Kenet | 165/2 |
| 5,224,648 | 7/1993 | Simon et al. | 236/51 |

OTHER PUBLICATIONS

"Passive Infrared Guest Room Energy Management System," Installation Instructions, Linear Corporation, Model 9HC40, Carlsbad, Calif. 1987.

"Managing guestroom energy effectively and reliably with passive infrared occupancy sensors," brochure for GEM5000, Linear Corporation, Carlsbad, Calif., 1990, 4 pages.

"Replace all of this with NAC Sensor," North American Technologies, Inc. brochure for Sensorstat 1000, 2000 and 3000, NTC, West Palm Beach, Fla., 1989.

Primary Examiner—William E. Wayner
Attorney, Agent, or Firm—Christie, Parker & Hale

[57] ABSTRACT

A wireless thermostatic control system includes a door sensor to detect when a room door is open, a transmitter associated with the door sensor to transmit signals indicating that the door sensor has been triggered, and a single thermostatic control unit for replacing a conventional thermostat which unit includes a receiver to receive the transmitted door signals, a sensor to determine whether a room is occupied in response to receipt of the transmitted signal, and two thermostatic controls, one for a room occupant and one for an energy-saving setback mode when the room is not occupied.

20 Claims, 10 Drawing Sheets

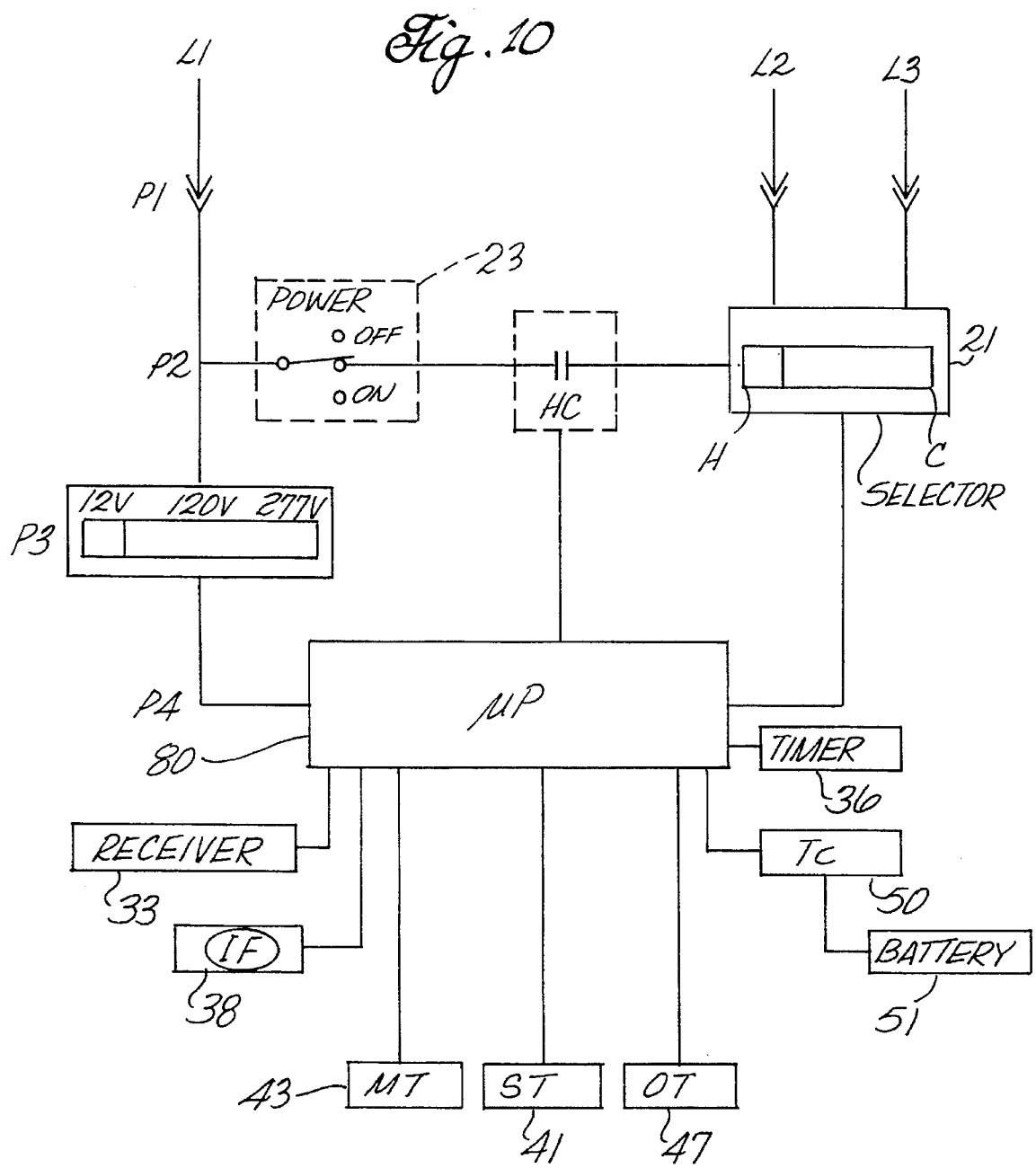

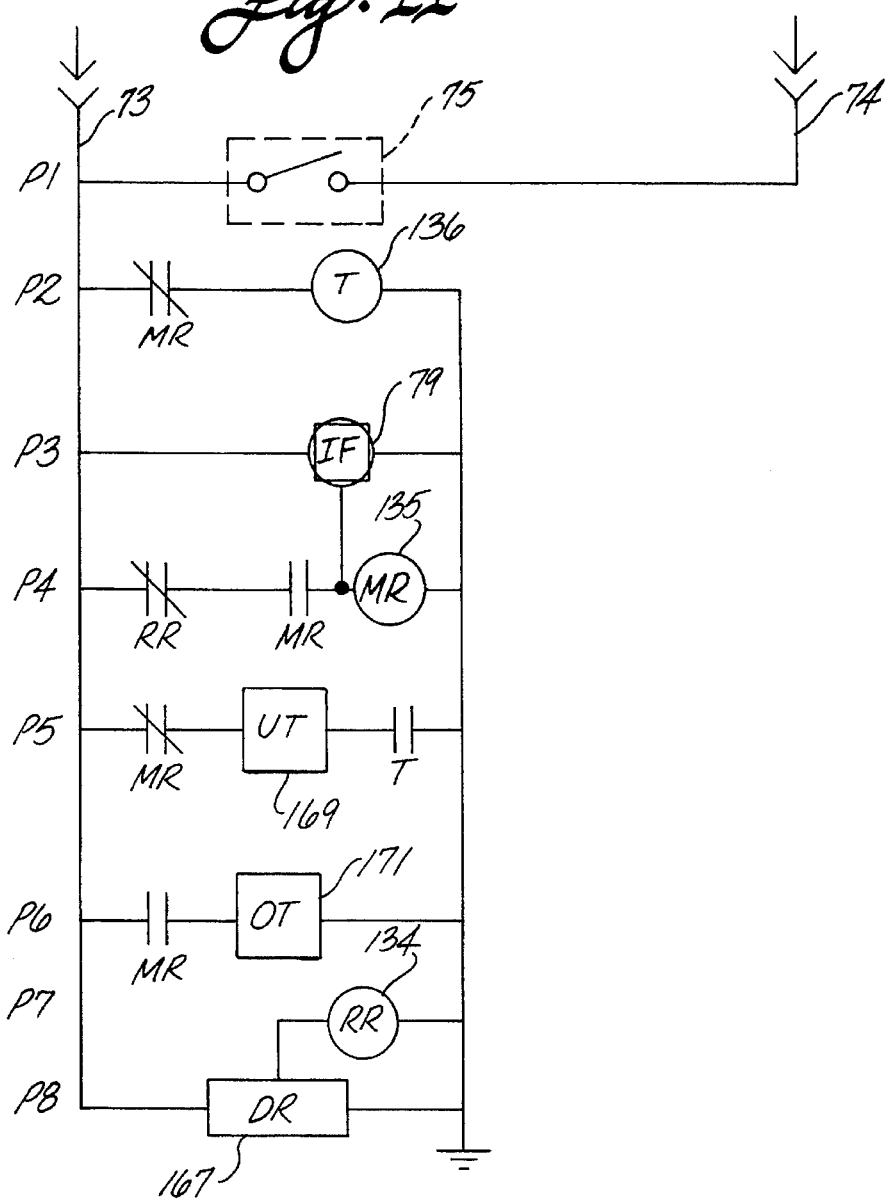
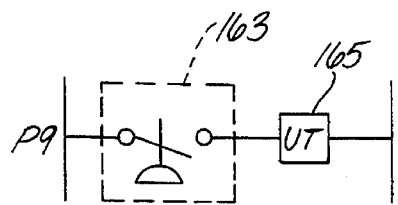

５,476,221

EASY-TO-INSTALL THERMOSTATIC CONTROL SYSTEM BASED ON ROOM OCCUPANCY

BACKGROUND OF THE INVENTION

The present invention relates to a wireless thermostatic control system based on room occupancy. More particularly, the present invention relates to a wireless thermostat control system based on room occupancy for saving energy by detecting whether or not a person is in the room and setting back energy requirements if the room is not occupied. In the hotel and motel industry, the cost of heating and cooling a room has been of concern for a long time. For example, U.S. Pat. No. 4,315,596 issued in 1980 to Johnson Jr. et al. discloses an energy conservation system for inns, hotels and motels for reducing the unproductive consumption of energy, primarily during periods where a room is unoccupied. Energy consumption during periods of non-occupancy is also of concern to individual consumers and in office buildings and other structures. Other patents of interest in this field include U.S. Pat. Nos. 5,127,575 to Beerbaum, 5,165,465 to Kenet, and 4,101,886 issued in 1978 to Grimes et al. All of these systems are complicated and require substantial hard wiring to install. There are also commercially available systems such as Linear Corporation's 9HC40 and GEM 5000 and North American Technologies' Sensorstat®1000, 2000 and 3000 which suffer from the same problems of complexity and difficulty of installation as the above patents.

For example, in the Grimes, et al. patent, the system includes a door switch, a dead bolt switch, a transmitter, a receiving means for receiving signals transmitted from the transmitter, a connecting means for connecting the receiving means to the particular appliance, such as a heating and cooling system's thermostat, and there is hard wiring not only between the door switch, dead bolt switch and transmitter and but also between the receiving means and appliance. The system will, upon the dead bolt being opened and the door being opened and closed, cause the transmitter to send out a signal to the receiving means connected to the existing controls of the particular appliance. There is a two and a half minute delay until the appliance enters a set back or turned off mode. When the room is reentered, the door switch detects opening and closing of the door. Reengagement of the dead bolt will then cause the transmitter to send out a signal to fully activate the appliances. Where set back control is used, the receiving means contains the extra thermostats and control circuitry to perform this function. The receiving means must thus have a separate source of energy from the appliance being controlled and must be hardwired to the existing thermostat. The commercially available systems use similar operation concepts as Grimes et al., but also use sensors to detect whether or not someone is in the room. In fact, these systems have hard wiring between a door switch and a power pack and between a sensor and the power pack associated with the extra thermostat control unit.

SUMMARY OF THE INVENTION

The invention provides a wireless thermostatic control system which includes a door sensor to detect when the room door is open, a transmitter associated with the door sensor to transmit signals indicating that the door sensor has been triggered, and a single thermostatic control unit for replacing a conventional thermostat. The single unit includes a receiver to receive the transmitted door signals, a sensor to determine whether a room is occupied in response to receipt of the transmitted signal, and two thermostatic controls, one for a room occupant and one for setback mode when the room is not occupied.

In a preferred embodiment, there is a detector unit mounted outside the room and in communication with the door sensor to detect whether or not there is someone in the room and to indicate such.

In another embodiment, there is also a modem connected to the thermostat unit and to the room phone to communicate with a computer at the front desk.

A smoke detector with a transmitter may also be incorporated into the system to send signals to the unit and in turn, via the modem, to signal the computer at the front desk that there is smoke in a particular room.

BRIEF DESCRIPTION OF THE DRAWINGS

The invention will be described in more detail with reference to the drawings in which:

FIG. 10 is a schematic diagram of a software control system which is an alternate embodiment for the circuitry of FIGS. 3–6;

FIG. 11 is a circuit diagram of a sensor unit where a passive infrared sensor is located therein for another embodiment of the invention;

FIG. 13 is a circuit diagram of a door switch for use with the embodiment of FIG. 11.

DETAILED DESCRIPTION OF THE PREFERRED EMBODIMENTS

Figure 1:
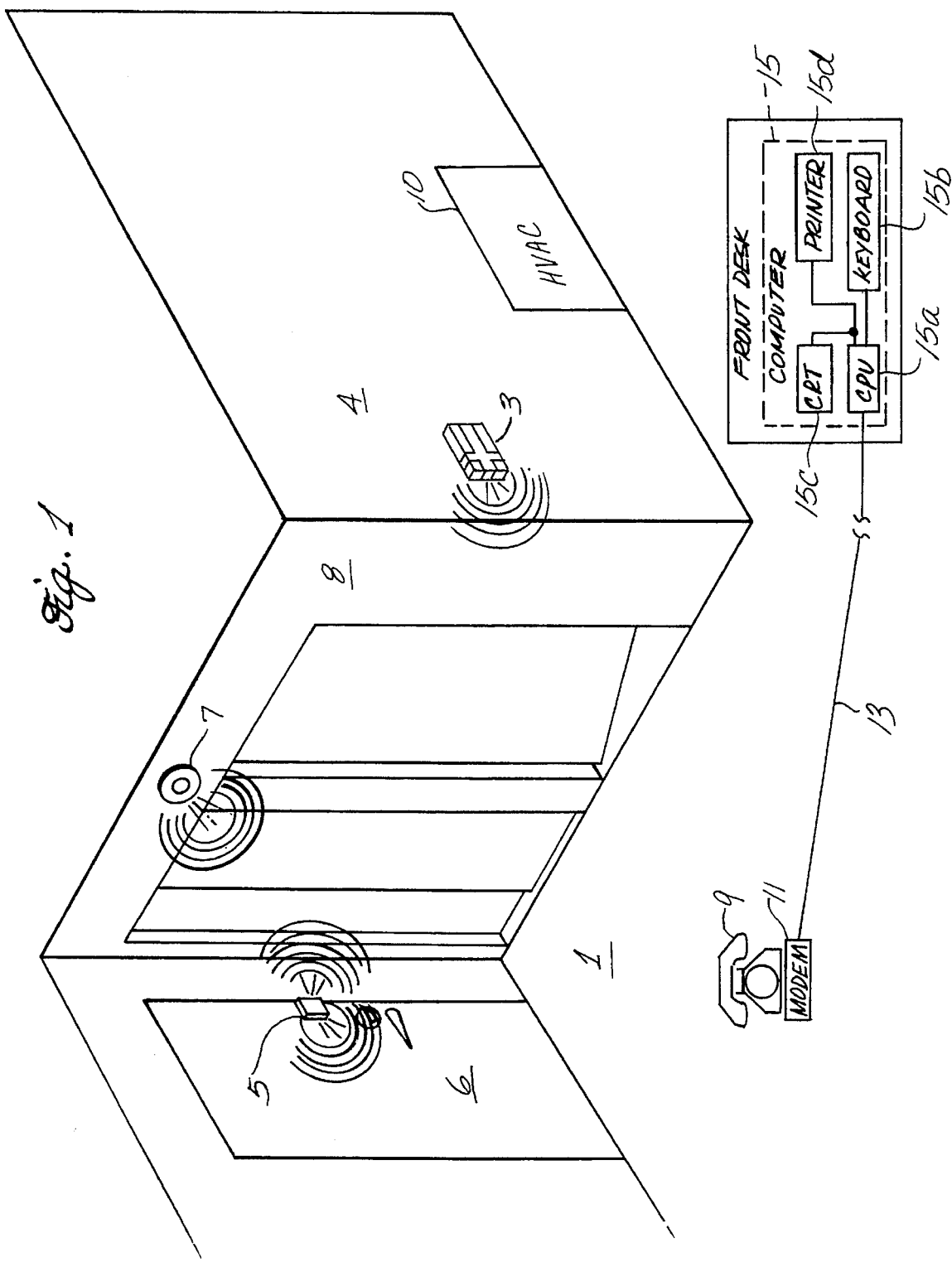
FIG. 1 is a partial view of a room in which the main elements of the invention are located and a partial schematic view of additional elements of the invention.

FIG. 1 shows a room 1 in which a preferred embodiment of the invention is shown. The room contains a thermostatic unit 3 mounted on a wall 4, a door switch unit 5 mounted on a door 6 to the room, a smoke detector unit 7 mounted on a wall 8 and a room telephone 9 having a modem 11 associated therewith. The modem communicates over telephone lines 13 with a computer 15 located at the front desk. The computer has a CPU, a keyboard, a CRT screen and a printer identified by reference numerals 15a–15d. There is also a conventional HVAC unit 10 which is connected to thermostatic unit 3 via the pre-existing wiring used for the conventional thermostat which unit 3 replaces. The unit 10 may be actually located in the room, or it may be part of a central HVAC system with unit 3 controlling the portion of the central system for serving that room.

Figure 2:
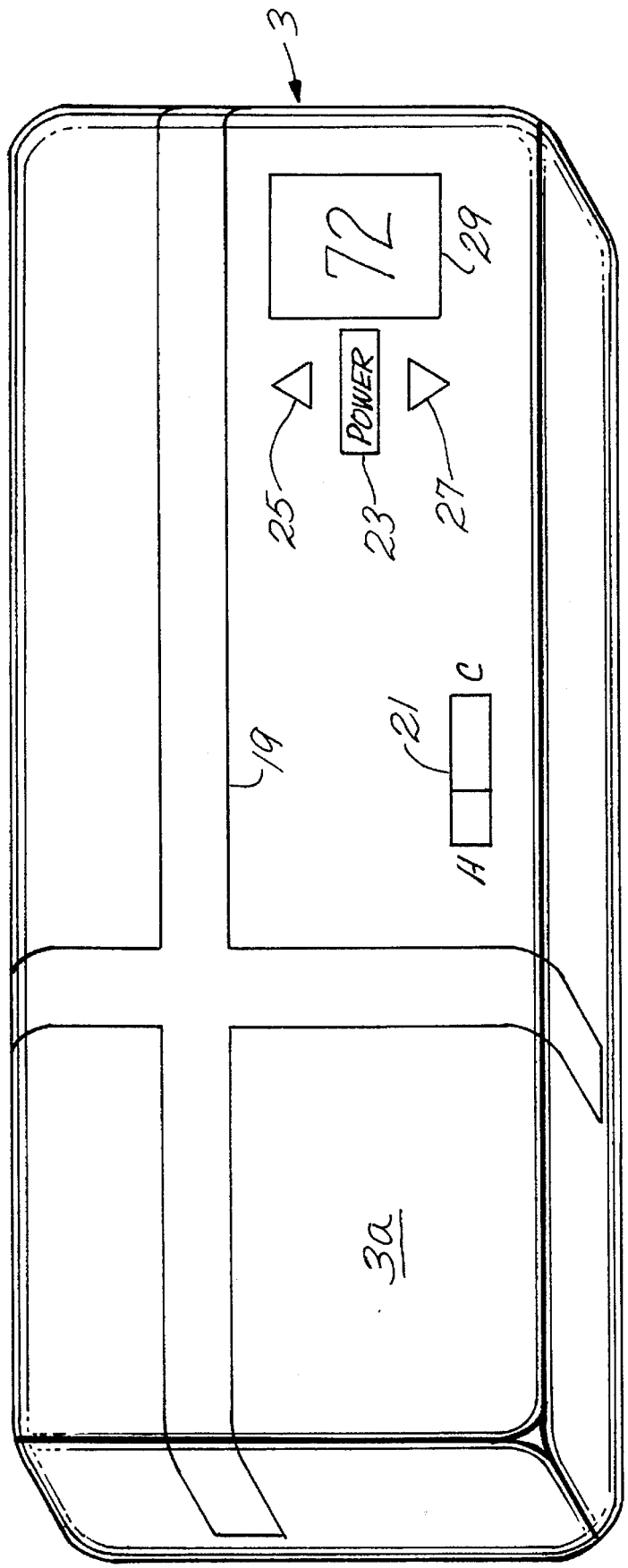
FIG. 2 is an enlarged perspective view of the thermostatic control unit according to the invention.

FIG. 2 is an enlarged view of thermostatic unit 3. Unit 3 includes a housing cover 3a with a cross-shaped window 19 for transmitting and receiving electromagnetic radiation or other signals. There is also a heating and cooling (H and C) selector 21, a power switch 23, a temperature up and a temperature down switch 25, 27, respectively, and a temperature setting indicator 29.

The basic operation of the system is that when a guest is in room 1, the guest has full control of the heating, ventilation and air conditioning (HVAC) by using switches 21, 23, 25 and 27. When the guest leaves the room, door 6 is opened and door switch unit 5 detects this state. It sends out an RF signal to unit 3 to start a room empty timer and to search the room for occupants. If the timer expires and no occupants have been found, unit 3 enters "setback mode." In other words, if the heating is on, it reduces the temperature setting to a predetermined amount and if the air conditioning is on, it increases the temperature setting to a predetermined amount, so that less energy is used. If an occupant is detected before the room empty timer times out, the thermostatic unit remains within the occupant's selected parameters.

The thermostatic unit 3 is thus a self-contained unit which includes a room occupancy detector, all of the normal thermostat controls and all of the thermostatic controls for entering the set back mode. Accordingly, this unit can be installed by simply changing out a conventional thermostat. A separate power supply or a separate unit containing relays and other circuitry and hard wiring between that unit and the conventional thermostat unit is eliminated. Moreover, as described later, the door switch unit is a self-contained unit including a switch to sense when the door is open and a transmitter to transmit a wireless signal to the thermostatic unit in response to opening of the door.

The details of circuitry suitable for the thermostatic unit 3 are shown in FIGS. 3–6 in various states of operation. The three main lines L1, L2 and L3 may be the existing live line, power for heat line, and power for cool line respectively. Path P1 represent the points where the lines are connected to the thermostatic unit 3. Line P2 contains the power switch 23, H/C selector switch 21 and an HC relay. Line P3 contains a voltage selector 28 to select appropriate voltage such as 12 volts.

Figure 3:
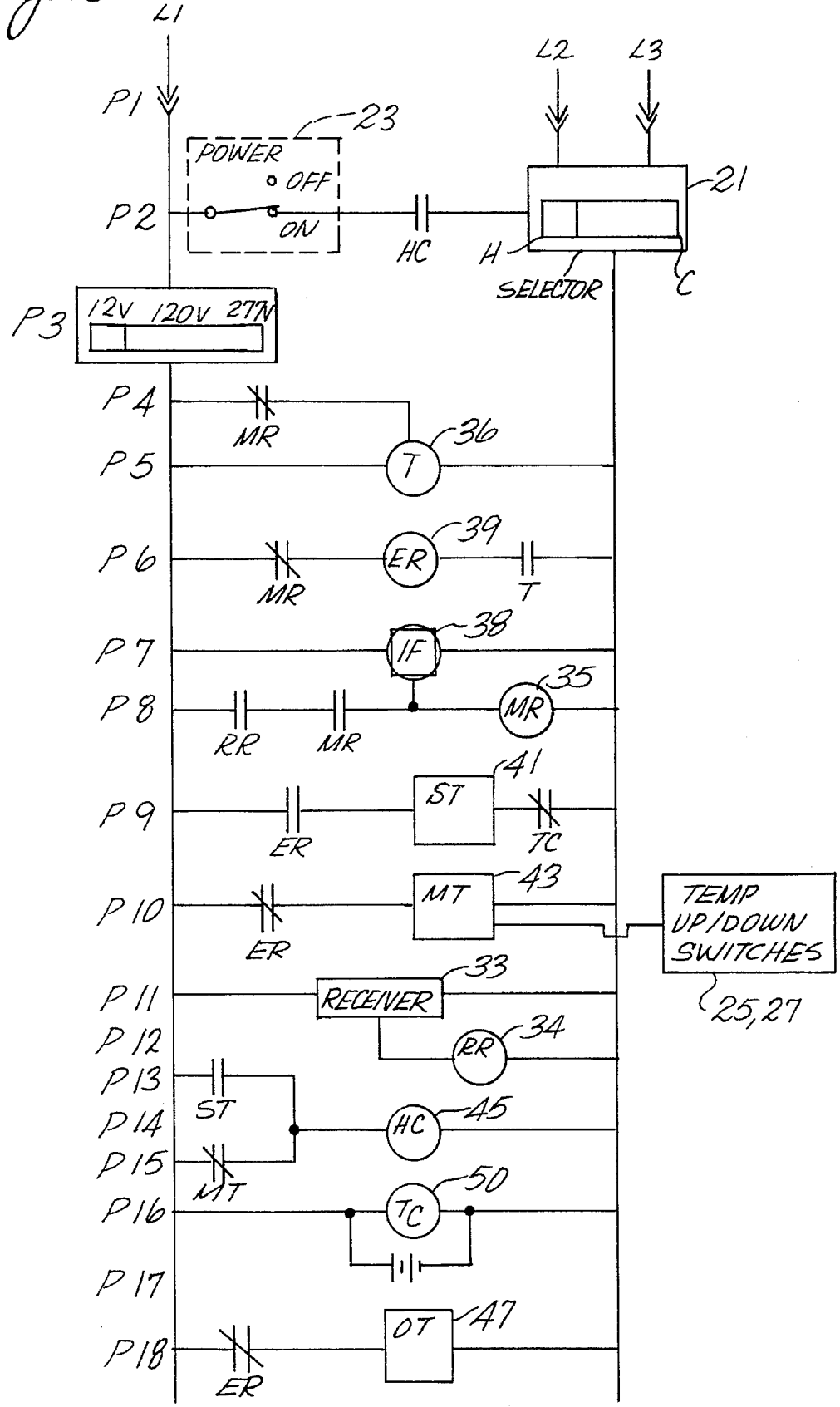
FIGS. 3–6 are wiring diagrams of the control circuitry in the thermostatic unit according to the invention, each of FIGS. 3–6 representing separate states of relays in the control system.

FIG. 3 represents the state where the door has been opened and the guest leaves the room. First, opening door 6 causes the door switch unit 5 to send a signal to receiver 33 which receives the signal through window 19 and it is received by receiver 33 at line P11. In turn, the receiver relay (RR) 34 at line P12 closes the RR contacts at line P8 which were in an open state. Since contacts MR at line P8 are in a closed state, the motion relay (MR) 35 then opens the MR contacts at line P8 and closes the MR contacts at lines P4 and P6. The RR contacts are only closed so long as the receiver 33 is receiving signals from the door switch unit. These signals are preferably RF signals, but may be any suitable electromagnetic, ultrasonic or other suitable wireless signal. The passive infrared sensor IF designated 38 is looking through window 19 to detect the presence of any occupants in the room. If no one has been detected within the predetermined time set by the timer 36, then as shown as FIG. 4, timer relay (T) 36 closes the relay contacts T at line P6 which energizes ER relay 39 which closes the ER contacts at line P9 and opens ER contacts at line P10. Since contacts TC at line P9 are normally closed in this condition, the set back thermostat (ST)41 is now in control and the main thermostat (MT)43 at line P10 is now bypassed. Whenever the temperature ranges in the set back thermostat 41 at line P9 are reached, the ST contacts at line P13 close which in turn energizes the heating/cooling relay (HC)45 at line P14 to close the HC contacts at line P2 to heat or cool as appropriate. Once the heating and cooling system has returned to within the limits of set back thermostat 41, the ST contacts at line P13 open and the heating and cooling relay 45 is deenergized thereby opening the HC contacts at line P2. As noted previously, the RR contacts at line P8 are normally closed and thus are shown in this state in FIG. 4. They will only be open, as also noted above, when receiver 33 is receiving signals from the door switch unit.

Figure 5:
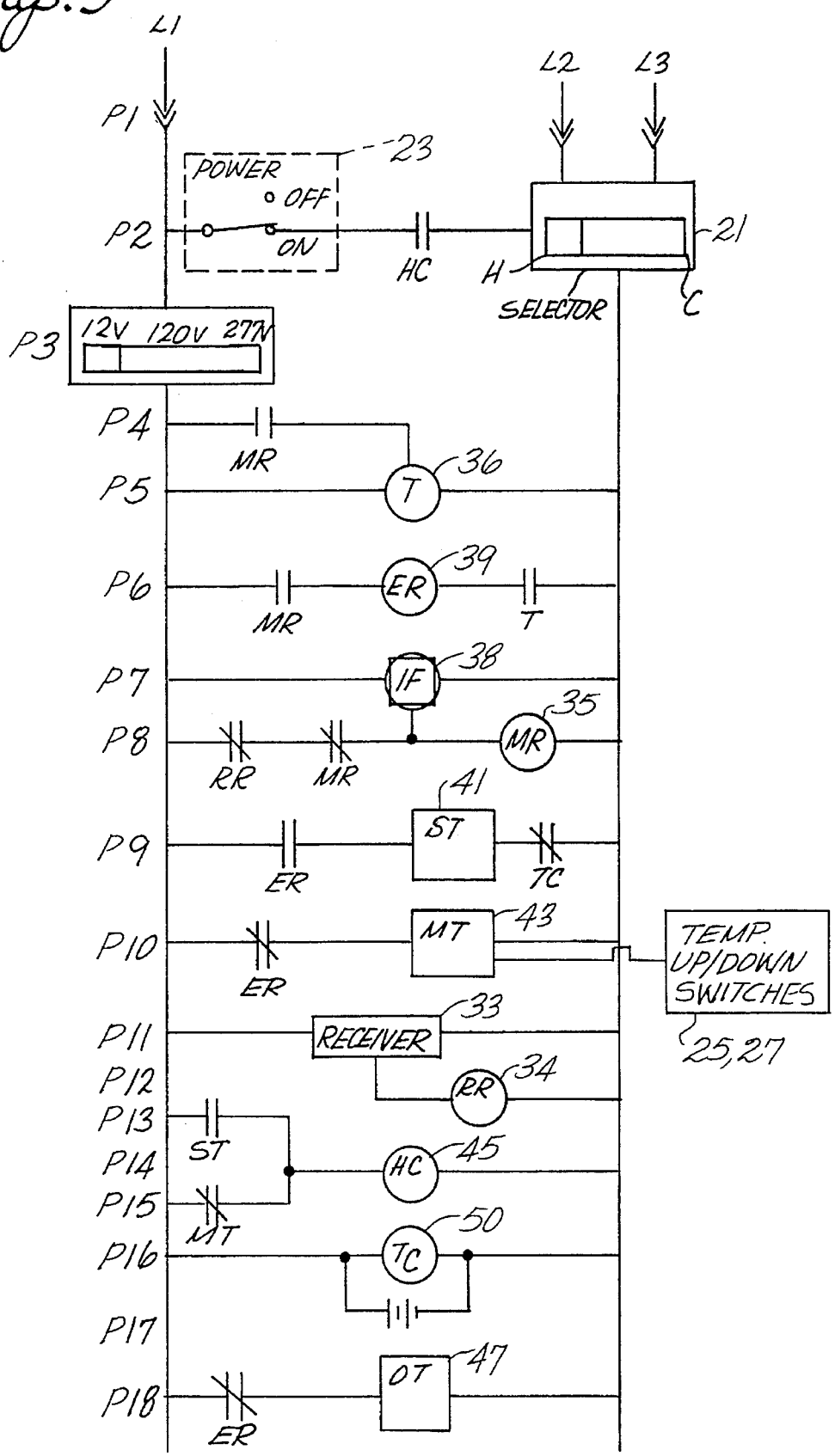

FIG. 5 shows the situation where sensor 38 detects the presence of a person before timer 36 times out. In this case, the T contacts at line P6 remain open. In addition, since sensor 38 detects a person, the MR relay 35 at line P8 is energized and therefore, closes the MR contacts at line P8 and opens the MR contacts at lines P4 and P6. ER relay 39 at line P6 will remain unenergized so ER contacts at lines P9, P10 and P18 remain in this state as shown in FIG. 3. This means that the set back thermostat 41 at line P9 is bypassed and the main thermostat 43 at line P10 is operative, as shown in FIG. 3. Again, the MT contacts close whenever the temperature parameter in main thermostat 43 is exceeded as set by the switches 25, 27. This energizes the HC relay 45 to close HC contacts at line P2 and heat or cool the room until the range of the main thermostat 43 is entered and the MT contacts at line P15 thus open.

In accordance with an aspect of the invention, modem 11 is used to transmit signals to computer 15 at the front desk since the ER contacts at line P18 are closed, and occupancy transmitter (OT) 47 transmits a signal, e.g., a radio frequency signal or other suitable signal to modem 11 which contains a radio frequency receiver and which in turn sends a signal to CPU 15a in computer 15 that the room is occupied.

Figure 4:
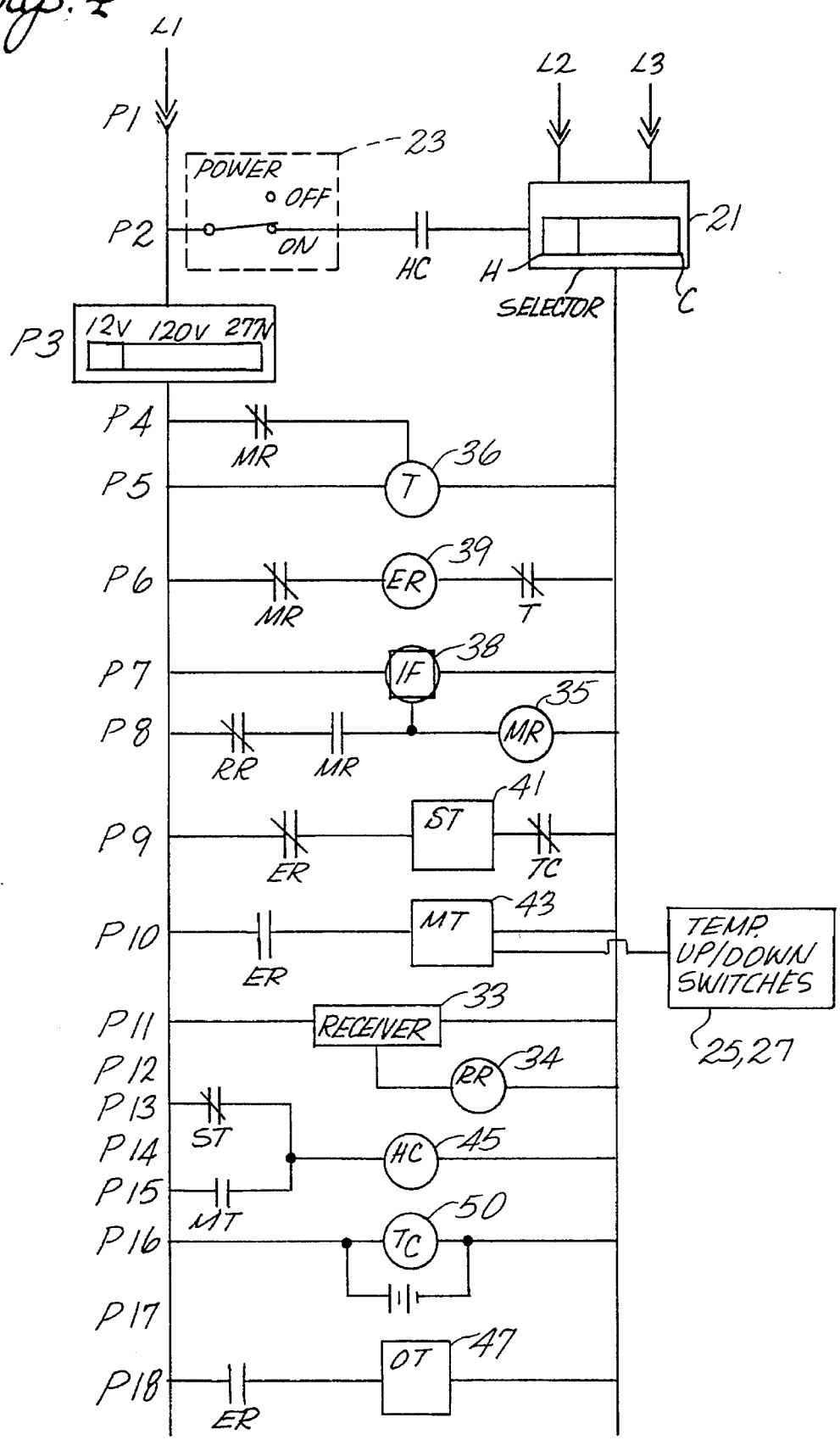
Figure 6:
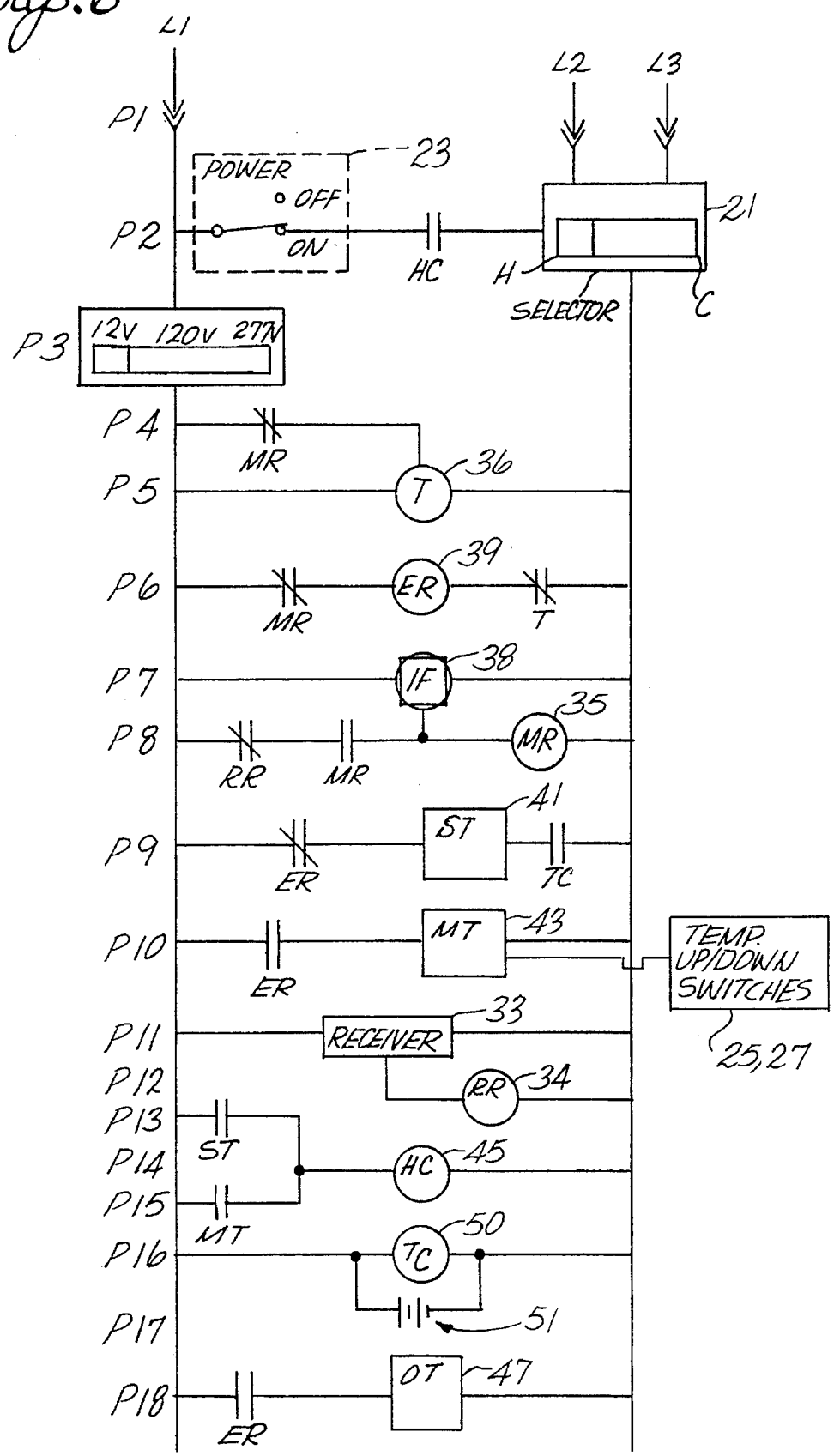

FIG. 6 represents the state where the room is empty as in FIG. 4. However, in this case there is the additional feature where the block out timer (TC)50 run by a battery 51 opens the normally closed TC contacts at line P9 thereby bypassing the set back thermostat 41. This totally shuts off heating and cooling, so it can be used to further reduce energy consumption at peak load periods, such as 10:00 a.m. to 3:00 p.m., or other desired peak load periods in the case where the room is not occupied. It is also best to use this aspect of the invention during a period which the room would normally be expected to be empty to minimize the likelihood that the occupant will return to an uncontrolled room. When the set back thermostat 41 is bypassed by the TC contacts being open, and the main thermostat is bypassed by the ER contacts at line P10 being open, the set back thermostat cannot close the contacts at line P13, thus HC relay 45 cannot be operated.

Another variation which can arise is that while the unit is in set back mode as in FIG. 4, the room door 6 may be opened and receiver 33 energizes relay 34 to open the RR contacts at line P8. Since the state of the MR contacts are such that the MR contacts at line P8 are open anyway, MR relay 35 remains in the same state. However, MR relay 35 gets energized by sensor 38 detecting the presence of a person since the sensor is wired to line P8 and causes MR contacts at lines P4 and P6 to open, and the MR contacts at line P8 to close. Since the MR contacts at line P4 open, timer relay 36 opens contacts T at line P6 too. This causes the ER relay 39 to switch the ER contacts at line P9 to open and at lines P10 and P18 to close. Therefore, the main thermostat 43 will operate. This connection of sensor 38 to line P8 so that the MR relay 38 is triggered even without the door opening is useful where the room is a suite or where there is more than one guest in the room, and one leaves while the other is in the bathroom. If set back mode is entered, when the guest in the bathroom returns to the main room, the unit will return to the main thermostat.

Another way to handle a suite is to put passive IR sensors in the extra room(s) and a transmitter in each to signal a receiver at unit 3 to energize the MR relay.

To go from FIG. 5 to FIG. 4, i.e., the occupied to the unoccupied state, when the door opens and receiver 33 energizes RR relay 34 causing the RR contacts at line P8 to close, the MR relay 35 opens the MR contacts at line P8 and closes the MR contacts at lines P4 and P6, as shown in FIG. 4. When the timer at line 36 times out, ER relay 39 is energized and the state of the ER contacts at lines P9 and P10 reverse from the state of FIG. 5 to the state of FIG. 4.

The set back thermostat 41 is preferably set by management and therefore, controls for it (not shown) would preferably be located inside the thermostatic unit housing cover.

Figure 7:
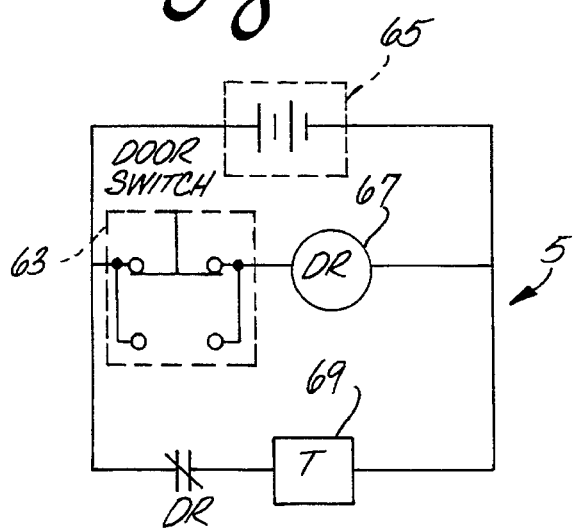
FIG. 7 is a circuit diagram of the door switch unit.

FIG. 7 is a diagram of the door switch unit 5. When door switch 63 is in a position shown by the solid lines, the door has been opened to energize door relay (DR) 67 and thus close normally-open contacts DR which causes transmitter 69 to send its signal to the thermostatic unit 3. Transmitter 69 is powered by an energy source 65 such as a battery, or, for example, a static switch. When the door switch moves to the dashed position which also energizes the door relay 67 to again energize the transmitter. The door relay 67 only closes the contacts DR for a limited time, such as two seconds whenever the door switch changes position. The limited signal duration is because this conserves power and is all that is necessary to trigger the receiver and relays in the thermostatic unit.

Figure 8:
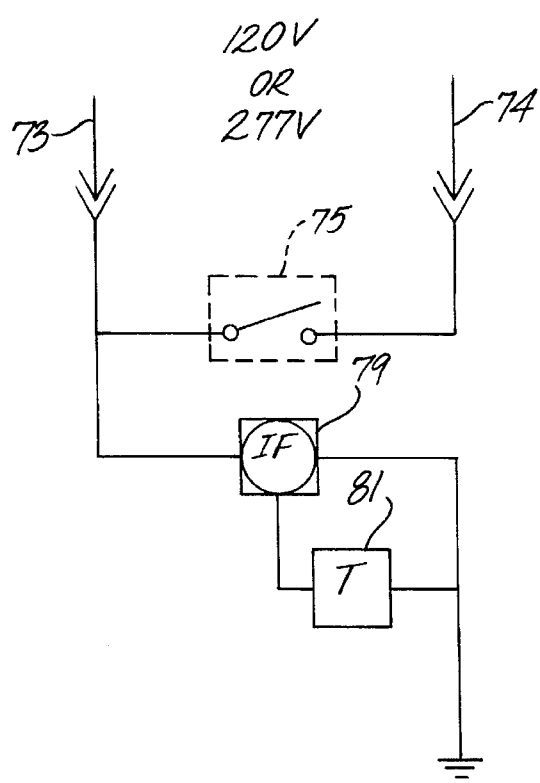
FIG. 8 is a circuit diagram for a variation of the door switch unit of FIG. 7.

An alternative embodiment for the door unit is shown in FIG. 8 where there is a light switch adjacent the front door to the room. Wire 73 is a live wire and wire 74 is leading to the light switch. Switch 75 detects when the door has been opened and closed when door switch 75 closes, and infrared sensor 79 detects the presence of someone in the room, transmitter 81 will transmit a signal to the thermostatic unit.

Figure 9:
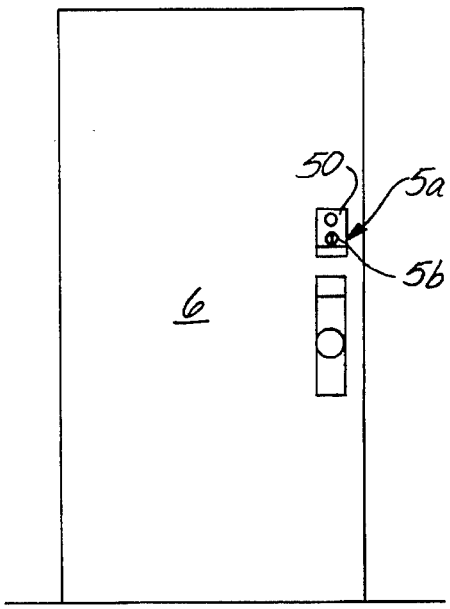
FIG. 9 is a view of the outside of the door to the room in which the invention is used, showing an indicator connected to the door switch for indicating whether or not the room is occupied.

In a further aspect of the invention, the front of door 6, as shown in FIG. 9 includes an occupancy indicating unit 5a. This unit includes a key or a key card reader 5b and an indicating mechanism 5c, such as an LED. When the maid or other authorized hotel personnel put a key or a key card in key hole or reader 5b, the LED or other indicator at 5c will indicate whether or not the room is occupied. This aspect of the invention is best used with the embodiment of FIG. 8. Switch 75 would correspond to an existing light switch.

The invention is best applied to an HVAC unit which has a thermostat separate from the HVAC system. For example, a central HV system with a room thermostat or a room unit connected to a separate thermostat. The invention can also be applied to a room unit with a built in thermostat.

Figure 12:
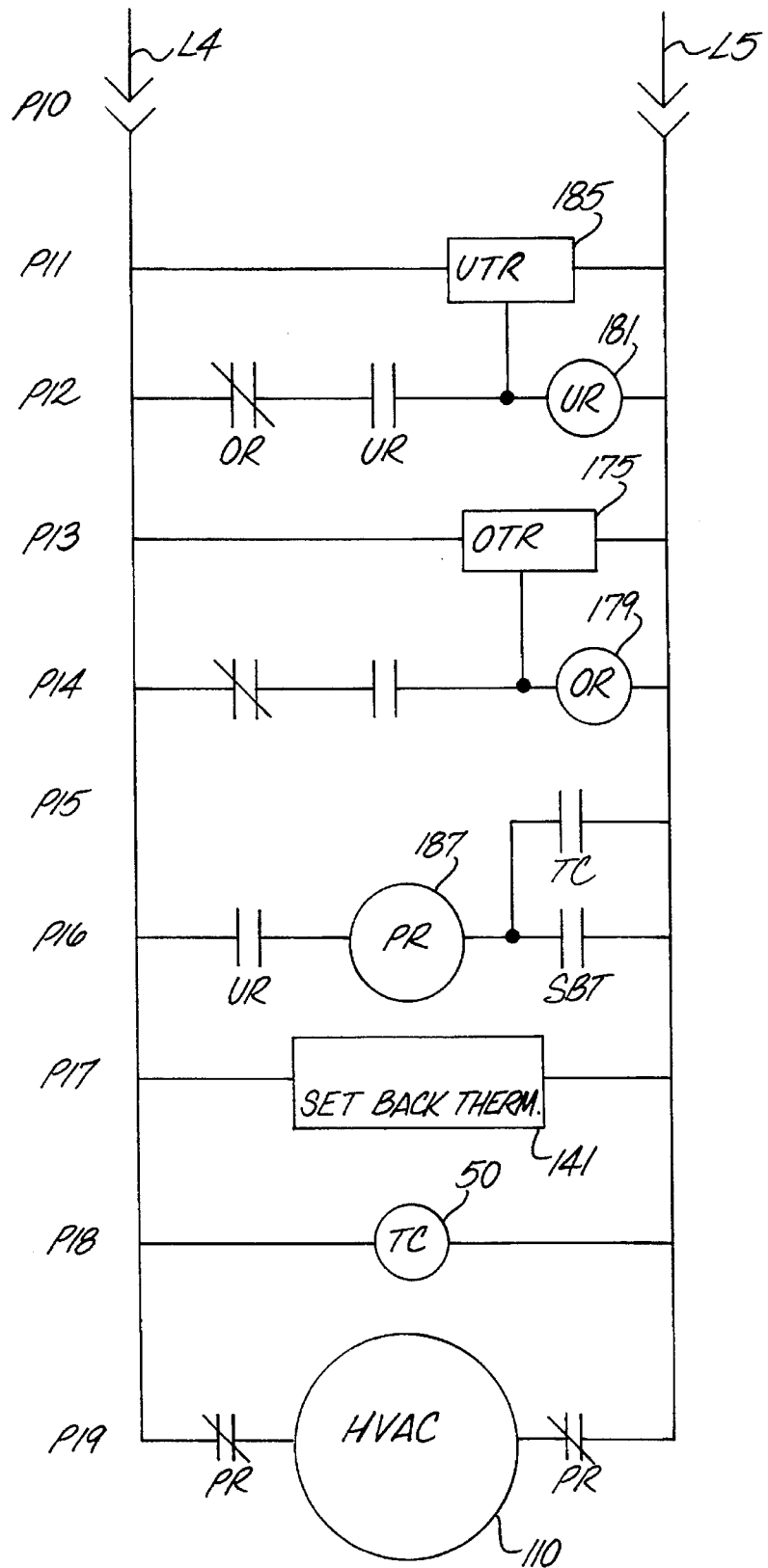
FIG. 12 is a circuit diagram of control circuitry of the thermostatic unit where an HVAC unit has a built-in thermostat control for use with the sensor unit of FIG. 11.

FIGS. 11, 12 and 13 show circuit diagrams in unenergized states of a sensor unit for sensing whether or not someone is in the room and transmitting this information, and an HVAC power box for receiving the transmitted information and controlling an existing HVAC unit and a door switch unit, respectively, for an embodiment of the invention where the HVAC unit has a built-in thermostat. This embodiment, in which like elements to prior elements have like references numerals, works as follows:

When the door is opened and closed, switch 163 closes to energize a signal transmitter 165, preferably an ultrasonic transmitter. Its signal is received by a door closed receiver (DR) 167 at line P8 in the sensor unit of FIG. 11. This in turn energizes receiver relay (RR) 134 at line P7, opening RR contacts at line P4 as long as the door closed receiver 167 receives a signal from the transmitter. If the room is occupied, the infrared sensor 79 at line P3 will energize motion relay (MR) 135 to close MR contacts at lines P4 and P6 and open MR contacts at lines P2 and P5. This triggers an occupancy transmitter (OT) 171 to send a wireless, e.g., an electromagnetic signal such as an RF signal, to an occupancy receiver (OTR) 175 at line P13 of the power box of FIG. 12. An occupancy relay (OR) 179 is thus energized at line P14 which closes OR contacts at that same line thereby keeping the occupancy relay energized. This also opens 0R contacts at line P12, which "locks out" an unoccupied relay (UR) 181 at line P12, thereby keeping UR contacts at line P14 closed and UR contacts at lines P12 and P16 open.

Accordingly, whenever sensor 79 detects someone, the UR contacts at line P16 of the power unit remain open which keeps a power relay 183 de-energized, and so both contacts PR at line P19, where the power box connects to the existing HVAC unit 110, remain closed. This keeps the HVAC unit in the control of the occupant. In addition, whenever sensor 79 detects someone, the timer 136 stops running because the motion relay 135 opens the MR contacts at line P2 which remain open because the MR contacts at line P4 are closed. When the door is opened and closed, the receiver relay 134 opens the RR contacts at line P4 thus starting the timer again until someone is detected.

If no one is detected for the predetermined period, timer relay 136 closes T contacts at line P5. This energizes unoccupied transmitter 169 causing an unoccupied receiver (UTR) 185 at line P11 of the power box to energize UR relay 181 which closes UR contacts at line P12, opens UR contacts at line P14 and closes UR contacts at line P16. This readies a power relay (PR) 187 to be energized when set back thermostat 141 at line P17 detects that the temperature is within its limits, in order to open both PR contacts at line P19 and thereby turn off the HVAC in spite of the built-in thermostat's setting. The HVAC unit will also be turned off during any block-out period set by timer clock 50, where the room is unoccupied.

It should be noted that the power box is preferably a single unit which plugs into a conventional outlet at lines L4, L5 and then has an outlet for receiving the HVAC unit's plug between the two sets of PR contacts at line P19. In this embodiment, it is preferred to use a sensor unit so that the sensor can be positioned in a place which covers a large portion of the room and, most preferably, at light switch 75 so that the unit can draw any needed power from existing wiring. This is because the existing HVAC unit is often plugged in at an outlet which is behind curtains or otherwise has an obstructed view of the room. The door switch unit can get power from a battery or a static switch for the ultrasonic transmitter.

The embodiment of FIG. 10 performs the functions shown in FIG. 6, but by means of a microprocessor 80. Elements which are the same as in FIGS. 3–6 are shown with the same reference numerals. The smoke detector 7 would contain a transmitter of a different frequency from OT 47 which would be wired so as to send signals to the modem 11 when the smoke is detected. An additional receiver in modem 11 of frequency matched to the smoke detector's transmitter would cause signals to be sent to the front desk to indicate smoke.

The system turns on and off the thermostat or puts the thermostat in full control of the hotel guest if they are in the room. It can set temperature back when the room is vacant, or at certain times turn off the heating and A/C completely if no one is in the room via the built in time clock which blocks out completely designated time periods. It will also notify front desk of occupancy of room by either guest, cleaning, maintenance, security, or hotel management. Further, cleaning, maintenance, security, or management do not need to disturb the guest, because at the front door a display panel will let them know if the guest is still in the room when they insert their key or ID card.

The smoke detector is incorporated into the system so that if the smoke detector is activated it will notify the front desk that the smoke detector has been activated and if there is anyone in the room and what the temperature of that room is. With this feature, the fire department will not waste valuable time going to rooms that are vacant and can go directly to those rooms that have people in them.

With this system the hotel can also track room usage, the temperature of the room, when the guest leaves or enters the room. When the cleaning, maintenance, security, and management personnel enter or leave the room, it will record the date and time, and store this into a data bank and or make a print out for hotel records.

In addition to this, it will notify the management when the room is occupied by guests, house keeping, maintenance, security, or other.

This will help management to track:

1. Room usage by guests.
2. House keeping routes and length of time spent on cleaning duties.
3. All other room entries and length of time occupying the room. Example: The guest notifies the desk when they will be away. The desk is notified by the unit immediately if the room is entered and by whom on their staff, or by someone other than authorized personnel. Also if the guest checks out, the desk will be notified if they try to re-enter the room.

The basic system will work as follows:

A. Guest enters the room. The room automatically returns to a normal operating mode. The guest then sets the thermostat to their desired temperature. The room will remain at this temperature as long as the guest is in the room, or until they change the setting.

B. When the guest leaves the room, the room goes into a set back mode, where the hotel management has predetermined what the setting should be in order to maximize energy saving temperature. In addition to this, management can further increase their savings, by blocking out the heating and air conditioning completely during peak load demand periods, if the room is empty.

Example: The guest sets thermostat at 70°. The management decides that a comfort range of no colder than 65° and no hotter than 79° can be set with no noticeable discomfort to the guest while they are away, and that the room will heat or cool to the guest setting when they return quickly enough so as not to inconvenience the guest. The hotel will recognize a substantial savings of energy due to the set back mode.

In addition to this, management can further decide that between the hours of 10 am and 2 pm, for example, when the room is unoccupied that no heating or cooling will take place, in order to save further during peak load demand periods when the utilities charge an additional premium.

Management can set this block-out time period to any duration, as well as start/stop times desired.

The system consists of a replacement room thermostat, front door transmitter, and an optional powerline transmitter and receiver and/or phone modem, to communicate with the front desk. At the front desk or at the security desk, a monitor will bring up the room status as well as a printer to print a log of the rooms trends, patterns, and status. Other options will include room thermostat custom programmers, front door card reading locks and associated software.

The front door sensor will incorporate a key or card reader, used by house keeping, maintenance, security, to let them know if the room is occupied, so that if it is, they need not disturb the guest. This sensor will also communicate with the thermostat, power line carrier, or phone modem, to let the hotel know who is occupying the room: Guest; House Keeping; Security; Maintenance; Other.

An integrated smoke detector will notify the Hotel when the smoke detector is activated via the thermostat power line carrier, or Phone Mode.

Additional sensors can be set in other rooms (as in the case of suites) to notify the thermostat that the room or suite is occupied.

No power needs to be run to it, because it receives its power for the existing heating and A/C wiring already in place. This is because this new thermostat is designed to replace the old room thermostat. Also, regardless of whether the installation is made in a new or existing hotel the installation is the same, no wiring is needed between the door sensor and the thermostat. Remote sensors can be set in other rooms, to signal the thermostat that these rooms are occupied.

The unit incorporates in its operation infrared signals, radio signals, phone modem communications, as well as computer interfacing:

The front door switch talks to both the thermostat and the phone modem. The switch tells the thermostat that the door is open and tells the phone modem who opened the door.

The thermostat tells the front door display and the phone modem, that the room is occupied. The thermostat also tells the phone modem what the temperature is.

The smoke detector tells the phone modem when it has been activated.

The phone modem then tells the computer at the front desk or where ever the computer is located, all the information it has received.

The computer then logs in all this information, the dates and times and displays this on the computer screen and/or prints the information out on a printer or both, as well as storing the information in a data bank.

While a passive IR sensor is preferred because it detects heat, a motion sensor may be used instead or other appropriate sensor.

As can be seen from the above, there are numerous variations of the invention which would be evident to one of ordinary skill in the art. For example, the present invention would be applicable for residential use, particularly where there are a small number of entrances and exits, e.g., an apartment or small house. Accordingly, the invention is defined by the appended claims and not limited to the disclosed embodiment.

What is claimed is:

1. An energy-saving thermostatic control apparatus for an air temperature control unit which is at least one of enabled for cooling in response to a control signal on a cooling control line and enabled for heating in response to a control signal on a heating control line, the thermostatic control apparatus comprising:

a thermostatic control unit for replacing an existing thermostatic controller for an air temperature control unit, the thermostatic control unit including:
(i) a housing;
(ii) means mounted in the housing for sensing the presence of a person in a room in which the control unit is located and for outputting an occupant detection signal in response thereto;
(iii) thermostat means mounted in the housing for selectively outputting a temperature control unit energizing signal in response to a room temperature reaching a first temperature setting when the occupant detection signal has been issued, and for outputting the temperature control unit energizing signal in response to a room temperature reaching a second predetermined temperature setting different from the first setting in the absence of the occupant detection signal;
(iv) means on the housing for enabling a room occupant to set the first setting to a desired temperature;
(v) means, on the housing and connected to the thermostat means, for direct connection to a live line for a thermostat to provide energy to the thermostatic control unit;
(vi) means on the housing for direct connection to at least one of a heating control line and a cooling control line for the air temperature control unit for outputting the temperature control unit energizing signal to the heating or cooling control line selectively in response to the thermostat means detecting the first setting when the occupant detection signal has been outputted and in response to the thermostat means detecting the second setting when the occupant detection signal has not been issued; and means responsive to opening of a door for sending a door open detection signal to the thermostatic control unit, wherein the thermostatic control unit includes means in the housing for receiving the door open detection signal and initiating the means for sensing in response thereto.

2. An apparatus as claimed in claim 1, further comprising means for timing a predetermined period in response to the door open detection signal, and wherein the means for controlling is responsive to the absence of the occupant detection signal for the predetermined period to control room temperature to the second setting.

3. The energy-saving apparatus of claim 1 wherein the means for sending comprises means for sending the door open detection signal as a wireless signal.

4. The energy-saving apparatus of claim 1 wherein the thermostat control means comprises a first thermostat having the first setting and a second thermostat having the second setting.

5. The energy-saving apparatus of claim 1 wherein the means for direct connection further comprises switch means for selectively connecting the temperature control unit energizing signal to the heating control line and the cooling control line.

6. The apparatus of claim 1 further comprising blockout means in the housing for preventing the thermostatic control unit from sending the second control signal to the air temperature control unit during a predetermined period of time.

7. The apparatus of claim 1 wherein the door unit further includes means accessible from an exterior of the room for determining whether or not an occupant is in the room.

8. The apparatus of claim 1 wherein the means for determining comprises a sensor.

9. An energy-saving thermostatic control apparatus for an air temperature control unit for air temperature control of a room comprising at least one of heating and cooling the room, the air temperature control unit being responsive to a signal on a control line for initiating air temperature control of the room, the control apparatus comprising:

sensor means for sensing the presence of an occupant in the room and issuing an occupant detection signal in response to sensing an occupant;

thermostat means settable to a first temperature setting for outputting a first control signal in response to the occupant detection signal and detecting the first temperature in the room and concurrently settable to a second temperature setting for outputting a second control signal in response to absence of the occupant detection signal and detecting the second temperature in the room, wherein the first and second temperature settings are independent of each other;

means connected to the thermostat means for enabling a room occupant to set the first temperature setting to a desired temperature; and connection means for connecting the out put of the thermostat means to the control line for the air temperature control unit to initiate air temperature control of the room in response to any one of the first and second control signals.

10. The apparatus of claim 9 further comprising blockout means for preventing the thermostatic control unit from sending the second control signal to the air temperature control unit during a predetermined period of time.

11. The apparatus of claim 9 wherein the air temperature control unit includes a heating control line and a cooling control line for initiating heating and cooling, respectively, and the connection means includes a switch for selecting connection to one of the heating control line and cooling control line.

12. The apparatus of claim 9 wherein the thermostat means comprises a first thermostat for having the first temperature setting and a second thermostat for having the second temperature setting.

13. The apparatus of claim 9 further comprising means for directly connecting the thermostatic control apparatus to a live wire for providing power to the thermostatic control apparatus.

14. The apparatus of claim 9 further comprising a housing for mounting the sensor means; thermostat means, means for enabling and connection means, and a door unit including means responsive to opening of a door to the room for sending a wireless signal to the housing, the housing having a receiver responsive to the wireless signal for enabling the sensor means.

15. The apparatus of claim 14 wherein the means for sending includes a power source comprising one of a battery and a static switch responsive to the opening of the door.

16. The apparatus of claim 14 further comprising means for enabling the sensor means for only a predetermined time in response to the wireless signal.

17. The apparatus of claim 14 wherein the door unit further includes means accessible from an exterior of the room for determining whether or not an occupant is in the room.

18. The apparatus of claim 9 wherein there is a housing for mounting the thermostat means, means for enabling, and connection means and wherein the sensor means is disposed on the housing.

19. The apparatus of claim 18 further comprising means responsive to opening of a door for sending a door open detection signal to the sensor means for initiating the sensor means.

20. An air temperature control unit having means for heating a room responsive to a heating control signal on a heating control line for initiating heating of the room, and means for cooling the room in response to a cooling control signal on a cooling control line for initiating cooling of the room, the air temperature control unit having a thermostatic control apparatus comprising:

a housing;

sensor means mounted in the housing for sensing the presence of an occupant in the room and issuing an occupant detection signal in response to sensing an occupant;

thermostat means mounted in the housing and settable to a first temperature setting for outputting a first control signal in response to the occupant detection signal and detecting the first temperature in the room and concurrently having a predetermined second temperature setting for outputting a second control signal in response to absence of the occupant detection signal and detecting the second temperature in the room, wherein the first and second temperature settings are independent of each other;

means on the housing connected to the thermostat means for enabling a room occupant to set the first temperature setting to a desired temperature; and connection means in the housing for connecting the output of the thermostat means to a selected one of the heating control line and cooling control line for the air temperature control unit to initiate heating of the room or cooling of the room in response to any one of the first and second control signals.

* * * * *